United States Patent [19]
Kipp et al.

[11] Patent Number: 5,838,944
[45] Date of Patent: Nov. 17, 1998

[54] SYSTEM FOR STORING PROCESSOR REGISTER DATA AFTER A MISPREDICTED BRANCH

[75] Inventors: Donald Kipp; Gregg Lesartre; Samuel David Naffziger; Jonathan P. Lotz, all of Fort Collins, Colo.

[73] Assignee: Hewlett-Packard Company, Palo Alto, Calif.

[21] Appl. No.: 693,825

[22] Filed: Jul. 31, 1996

[51] Int. Cl.[6] .................................................. G06F 9/302
[52] U.S. Cl. ....................... 395/394; 395/394; 395/392; 395/393
[58] Field of Search ................................ 395/394, 393, 395/392

[56] References Cited

U.S. PATENT DOCUMENTS

| | | | |
|---|---|---|---|
| 5,345,569 | 9/1994 | Tran | 395/393 |
| 5,463,745 | 10/1995 | Vidwans et al. | 395/394 |
| 5,497,493 | 3/1996 | Colwell et al. | 395/800.23 |
| 5,584,037 | 12/1996 | Papworth et al. | 395/800.23 |
| 5,625,788 | 4/1997 | Boggs et al. | 395/390 |
| 5,689,693 | 11/1997 | White | 395/565 |

FOREIGN PATENT DOCUMENTS

0432774A2  6/1991  European Pat. Off. .......... G06F 9/38

OTHER PUBLICATIONS

Lenell et al. (A 20 MHz CMOS Re–order Buffer for a Superscalar Microprocessor) pp. 6, 9–10 1992.
Tomasulo, R.M., "An Efficient Algorithm for Exploiting Multiple Arithmetic Units", IBM Journal, Jan. 1967, pp. 25–33.
Lightner, Bruce D., "The SPARC Lightning Processor", HOT CHIPS II, 1990 Symposium on High Performance Chips.
Popescu et al. (The Metaflow Architecture) IEEE Micro. pp. 10–13 and 63–73, Jun. 1991.

*Primary Examiner*—Parshotam S. Lall
*Assistant Examiner*—Gautam R. Patel

[57] ABSTRACT

A system for recovering most recent writer status when a mispredicted branch occurs in a processor that executes instructions out of order. A queue holds instructions stored in the order they are fetched from memory. Each slot in the queue stores a target register that will receive the results of the instruction, and a most recent writer status bit indicating whether the slot is the last instruction to write to the target register. When inserting a new instruction, each slot compares the target register of the new instruction to its target register, and when a match occurs, the slot resets its most recent writer status, and stores the new instruction slot number as a target taker. When a mispredicted branch occurs, the slot compares the mispredicted branch slot to the target taker slot, and when the target taker slot is greater, the slot regains the most recent writer status.

12 Claims, 5 Drawing Sheets

| SLOT | TARGET REG | SOURCE 1 | SOURCE 2 | TARGET TAKER | MRW | INSTRUCTION |
|---|---|---|---|---|---|---|
| 0 | | | | | | |
| 1 | 3 | 1 | 2 | 7 | (SET) | ADD 1, 2 → 3 |
| 2 | | | | | | |
| 3 | | | | | | |
| 4 | | | | | | BRANCH |
| 5 | | | | | | |
| 6 | | | | | | |
| 7 | 3 | 4 | 5 | | SET | ADD 4, 5 → 3 |

FIG. 5

SYSTEM FOR STORING PROCESSOR REGISTER DATA AFTER A MISPREDICTED BRANCH

FIELD OF THE INVENTION

This invention relates to computer processors and more particularly to computer processors that execute instructions out of order. Even more particularly, the invention relates to an apparatus and method for recovering from a mispredicted branch within such processors.

BACKGROUND OF THE INVENTION

Conventional processor designs, typically using a RISC instruction set, often use a pipelined architecture wherein several instructions are processed concurrently. In a pipelined architecture, instructions are often processed in three stages, although the number of stages can vary. In the first stage, called fetch, the instruction is fetched from either cache or main memory into the processor. In the second stage, called execution, the resources needed by the instruction are analyzed and if these resources are available, the instruction is performed. In the third stage, called retire, the results of the instructions are stored into the processor registers or into memory depending upon the instruction type.

During both the execution and retire stages, the instruction is stored inside the processor, within a small high-speed memory area called an instruction queue. Sometimes there is more than one instruction queue. While in the instruction queue, or queues, every attempt is made to execute as many instructions concurrently as possible, to improve performance of the processor. To further improve processor performance, when a branch instruction is fetched, an attempt is made to predict whether the branch instruction will cause a branch or not cause a branch. Once the prediction is made, instructions are fetched depending upon the prediction. If, when the branch instruction is actually performed, the prediction turns out to be incorrect, all the instructions fetched after the branch instruction must be discarded.

Because of the attempt to perform as many instructions as possible in parallel, instructions are performed out of order. Because of the out of order execution, the results of an instruction may not be saved into the machine state. For example, when two instructions are being executed and the results of the first instruction are only used by the second instruction, only the results from the second instruction need to be saved into the machine state. The results of the first instruction will not be saved even if a branch instruction exists between the two instruction, if the branch is predicted to not be taken. However, when the branch is mispredicted, the results of the second instruction will be discarded, so the results produced by the first instruction must now be saved into the machine state. Thus, status information, called most recent writer status, that indicates that the results of an instruction will be saved into the machine state, must be recovered from the second instruction, and given back to the first instruction.

One prior art solution to this problem is to retire all instructions prior to the mispredicted branch, when the mispredicted branch occurs, and then resume processing on the correct path after the branch. This incurs a severe performance penalty, however, since it removes from the processor the ability to execute any instructions for multiple states whenever a mispredicted branch occurs.

There is need in the art then for a system that can recover results from instructions occurring before a mispredicted branch, after the mispredicted branch occurs. The present invention meets these and other needs in the art.

SUMMARY OF THE INVENTION

It is an aspect of the present invention to recover from a mispredicted branch within a processor of a computer system.

It is another aspect of the invention to recover a most recent writer status for an instruction when a later occurring branch instruction is mispredicted.

A further aspect of the invention is to recover most recent writer status for an instruction occurring before a mispredicted branch from an instruction occurring after the mispredicted branch.

The above and other aspects of the invention are accomplished in a system for facilitating recovering most recent writer status when correcting for a mispredicted branch in a processor of a computer system that executes instruction out of order. The system has a sort system within the processor for storing instructions to be executed in the order the instructions are fetched from a memory of the computer system. The instructions are stored in a queue having a plurality of slots.

Each slot within each queue has a target register that stores the number of a register that will receive the results of the instruction stored in the slot, after the instruction is retired. Each slot also has a most recent writer status bit that indicates whether the slot is the last instruction in the queue to write to the target register.

When a new instruction is inserted into the queue, each slot in the queue examines the target register of the instruction being inserted, and if it matches the target register contained in the slot, the slot resets its most recent writer status, and stores the slot number of the instruction being inserted into the queue into a target taker register.

When a mispredicted branch occurs, the slot number of the mispredicted branch is broadcast to all the slots, and each slot compares the slot number of the mispredicted branch to the slot number in the target taker register. When a slot detects that the target taker slot number is greater than the mispredicted branch slot number, the slot knows that the target taker instruction will be discarded, so the slot regains the most recent writer status from the slot that will be discarded by setting its own most recent writer status bit.

The present invention can also be expressed as a method for facilitating recovering most recent writer status when correcting for a mispredicted branch in a processor of a computer system that executes instruction out of order. The steps of the method are 1) storing instructions to be executed in the order the instructions are fetched from a memory of the computer system, and 2) receiving instructions being stored into a queue. Step 2) has substeps that include receiving, into a slot of the queue, a target register number of a register for receiving the results of an instruction received into the slot; storing an indication that the instruction in the slot is the last instruction in the queue to write to the target register number; comparing the target register number to a second target register number received when a subsequent instruction is being inserted into the queue, and storing a slot number of the subsequent instruction, when the compare circuit indicates that the target register number equals the subsequent target register number; and receiving a slot number of a mispredicted branch and comparing the slot number of the mispredicted branch to the subsequent instruction slot number, and setting the most recent writer status bit of the slot when the second compare circuit indicates that the subsequent instruction slot number is greater than the slot number of the mispredicted branch.

BRIEF DESCRIPTION OF THE DRAWINGS

The above and other objects, features, and advantages of the invention will be better understood by reading the following more particular description of the invention, presented in conjunction with the following drawings, wherein:

FIG. 5 shows a diagram of several instructions wherein the most recent writer status is recovered.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
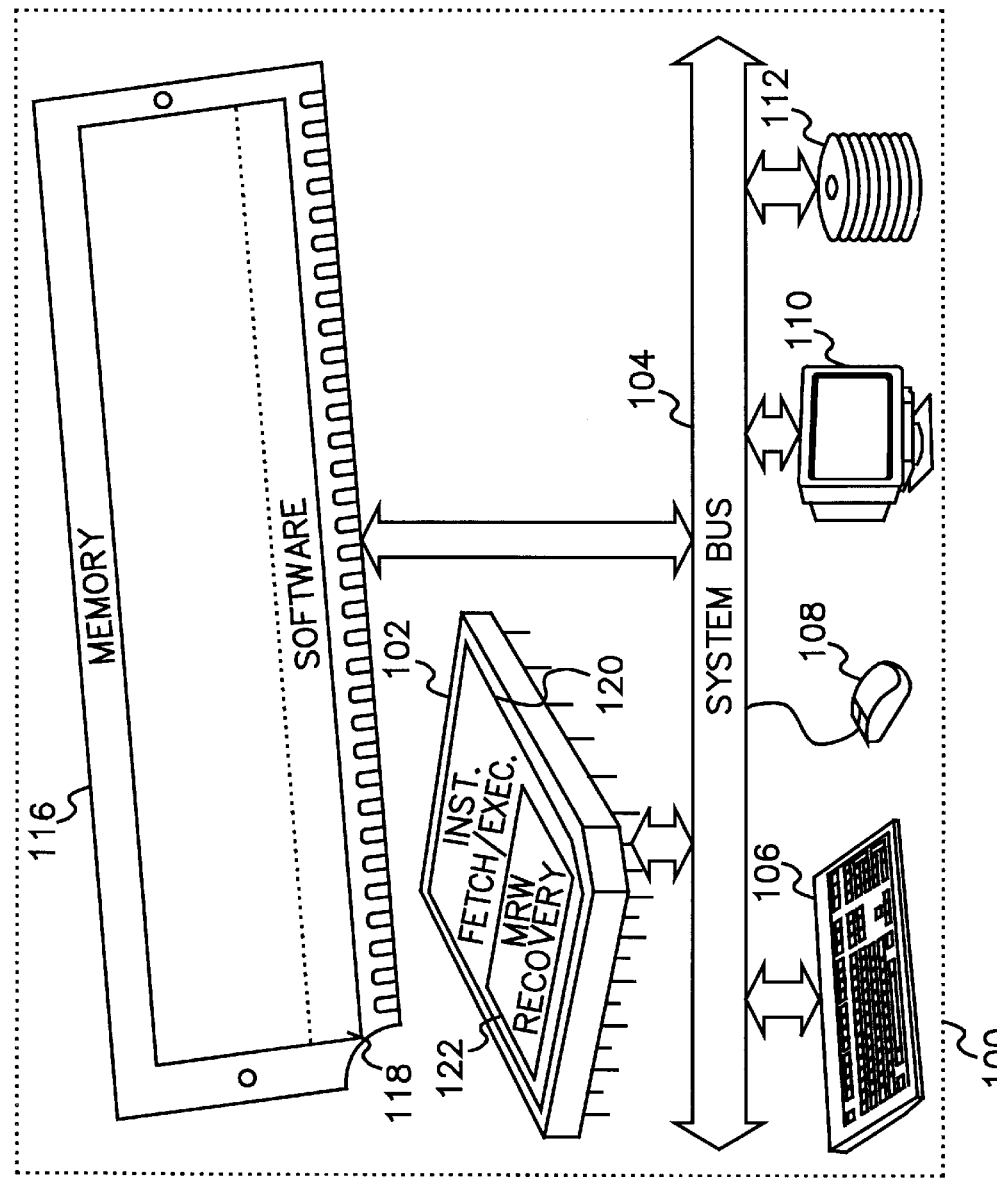
FIG. 1 shows a block diagram of a computer system incorporating the most recent writer status recovery circuit within a processor of the computer system.

FIG. 1 shows a block diagram of a computer system incorporating the most recent writer status recovery circuit within a processor of the computer system. Referring now to FIG. 1, a computer system 100 contains a processor 102. The processor 102 communicates with other elements of the computer system 100 over a system bus 104. A keyboard 106 and a pointer device 108 allow input to the computer system 100 while a display device allows software within the computer system to output information to a user of the computer system 100. A disk 112 is used to store data and software that utilize the apparatus and method of the present invention. A memory 116 contains software 118 that performs instructions that utilize the present invention.

Within the processor 102, an instruction fetch and execute circuit 120 is used to fetch, perform, and retire instructions. Within the instruction fetch and execute system 120 is the most recent writer recovery circuit 122 of the present invention.

Figure 2:
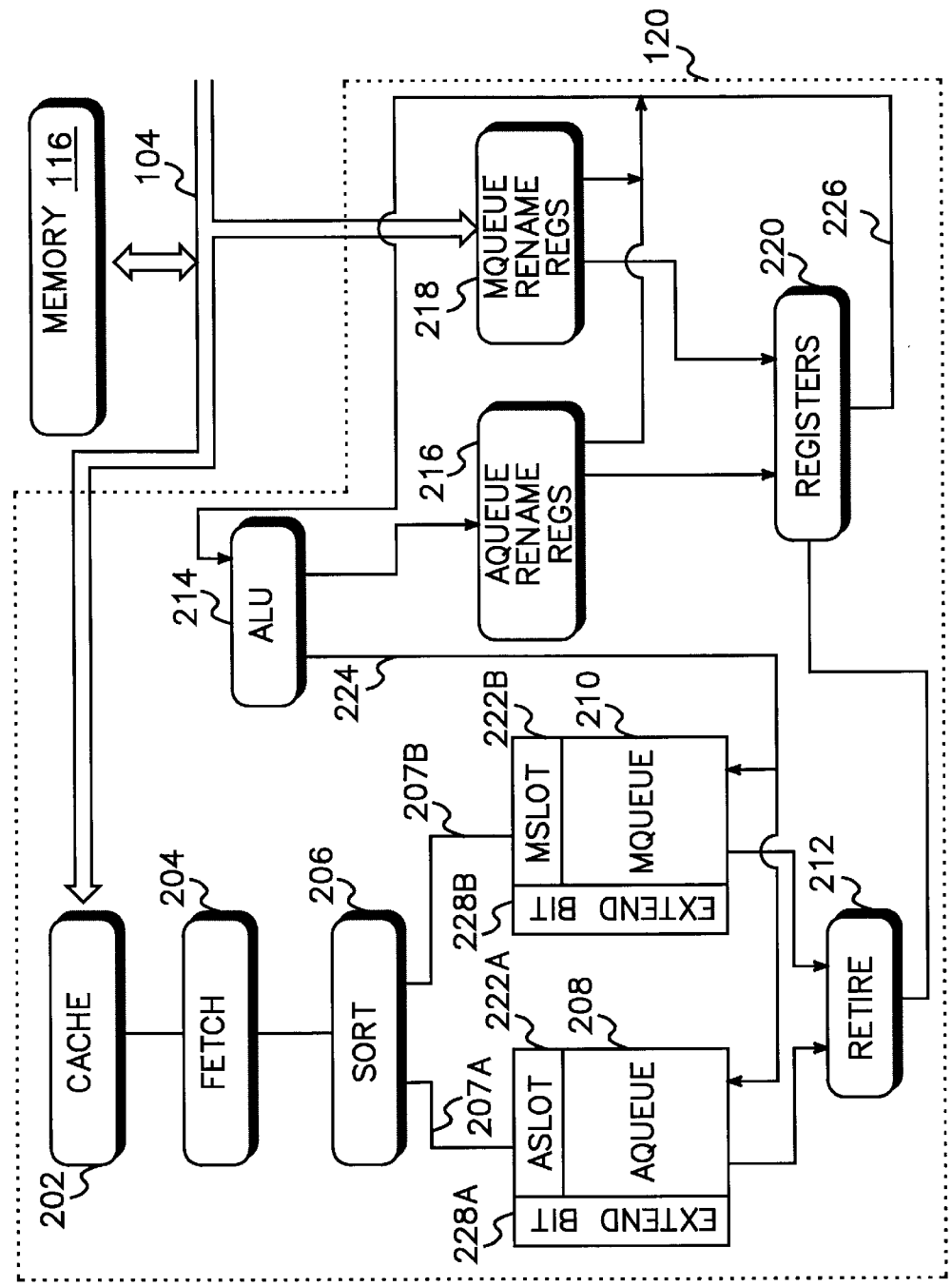
FIG. 2 shows a block diagram of a portion of the instruction fetch and execution system of FIG. 1.

FIG. 2 shows a block diagram of a portion of the instruction fetch and execute system 120 of FIG. 1. Referring now to FIG. 2, the instruction fetch and execute system 120 has a cache 202 for storing instructions and data from the software 118 (FIG. 1). A fetch system 204 communicates with the cache 202 and retrieves instructions from the cache 202 for ultimate execution. In the preferred embodiment, the fetch system 204 fetches four instructions, each being 32 bits, at a time and transfers the instructions to a sort system 206.

From the sort system 206, the instructions are sent to a suitable reordering mechanism, such as queues or a reservation station. In the preferred embodiment, the instructions are sorted and distributed, or "inserted" into an arithmetic logic unit (ALU) queue (aqueue) and a memory queue (mqueue), depending upon the operation to be accomplished by each instruction. More specifically, the sort system 206 receives the instructions from the fetch system 204 and determines whether each instruction is directed to an operation involving either an arithmetic execution unit 214, which contains either an arithmetic logic unit for integer operations or a multiply/accumulate unit for a floating point operation, or the memory 116. The sort system 206 distributes arithmetic and memory instructions along respective paths 207A and 207B that are ultimately destined for the aqueue 208 or the mqueue 210, respectively.

The aqueue and mqueue each have a group of slots, 28 in the preferred embodiment, wherein each slot holds one instruction. The system organizes both the aqueue and the mqueue as circular lists, such that after storing an instruction into the last slot of a queue, the next instruction will be stored into the first slot. This causes a problem when comparing the slot numbers, however, so the system prepends an extend bit 228a and 228b, respectively, onto the address of each slot in the aqueue and the mqueue. Each time storing of instructions progresses from the last slot to the first slot, the extend bit for the queue is inverted. This extend bit is used in comparing the slot numbers, as will be discussed below with respect to FIG. 4.

For each branch instruction, the fetch system 204 predicts whether the branch will be taken or not taken, and this prediction information is passed through the sort system 206 and stored along with the branch instruction into the aqueue 208 or the mqueue 210 respectively. In the preferred embodiment, branch instructions are actually stored in both the aqueue 208 and the mqueue 210 to facilitate recovering from a mispredicted branch.

The aqueue 208 contains a plurality, 28 in the preferred embodiment, of a slots 222A that have registers for storing respective instructions that are directed to provoking operations at one or more, two in the preferred embodiment, arithmetic logic units 214. The arithmetic instructions in the aqueue 208 are executed in any order possible. When execution of an instruction is commenced in either the aqueue 208 or the mqueue 210, then the instruction is said to have "launched". The ALU 214 receives one or more operands from rename registers 216 and 218 and general registers 220, through path 226, pursuant to each instruction and operates upon the operands. As an instruction completes operation upon the operands, the results are captured by the aqueue rename registers 216, and the instruction is marked as complete in the particular a slot 222A of the aqueue 208. In the preferred embodiment, the aqueue 208 receives up to four instructions per cycle from the sort system 206 and transfers up to two instructions per cycle to a retire system 212.

The retire system 212 retires the instructions in the order they are stored in the slots of the queues, by taking the results produced by the instruction and stored in the rename registers, and storing these results into the regsters 220 of the processor, or by storing the results into the memory 116 and cache 202, depending upon the type of instruction being retired.

The sort system 206 stores instructions into the aqueue 208 and the mqueue 210 in the order that the instructions are fetched by the fetch system 204. Because of the out of order nature of the processor, the instructions are not necessarily executed in the order in which they are stored in the aqueue 208 or the mqueue 210. However, because the instructions are stored in order, when a mispredicted branch occurs, the instructions that occur in the queue after the branch can be readily identified as having been stored into the aqueue or the mqueue later than the branch instruction itself. Thus, by way of example, if a branch instruction were in slot 12 of the aqueue, and this branch instruction was mispredicted, all instructions after slot 12 need to be discarded. In this example, "after" may include instructions that are stored at lower numbered slots in a queue, but have their extend bits inverted, as discussed above.

Figure 3:
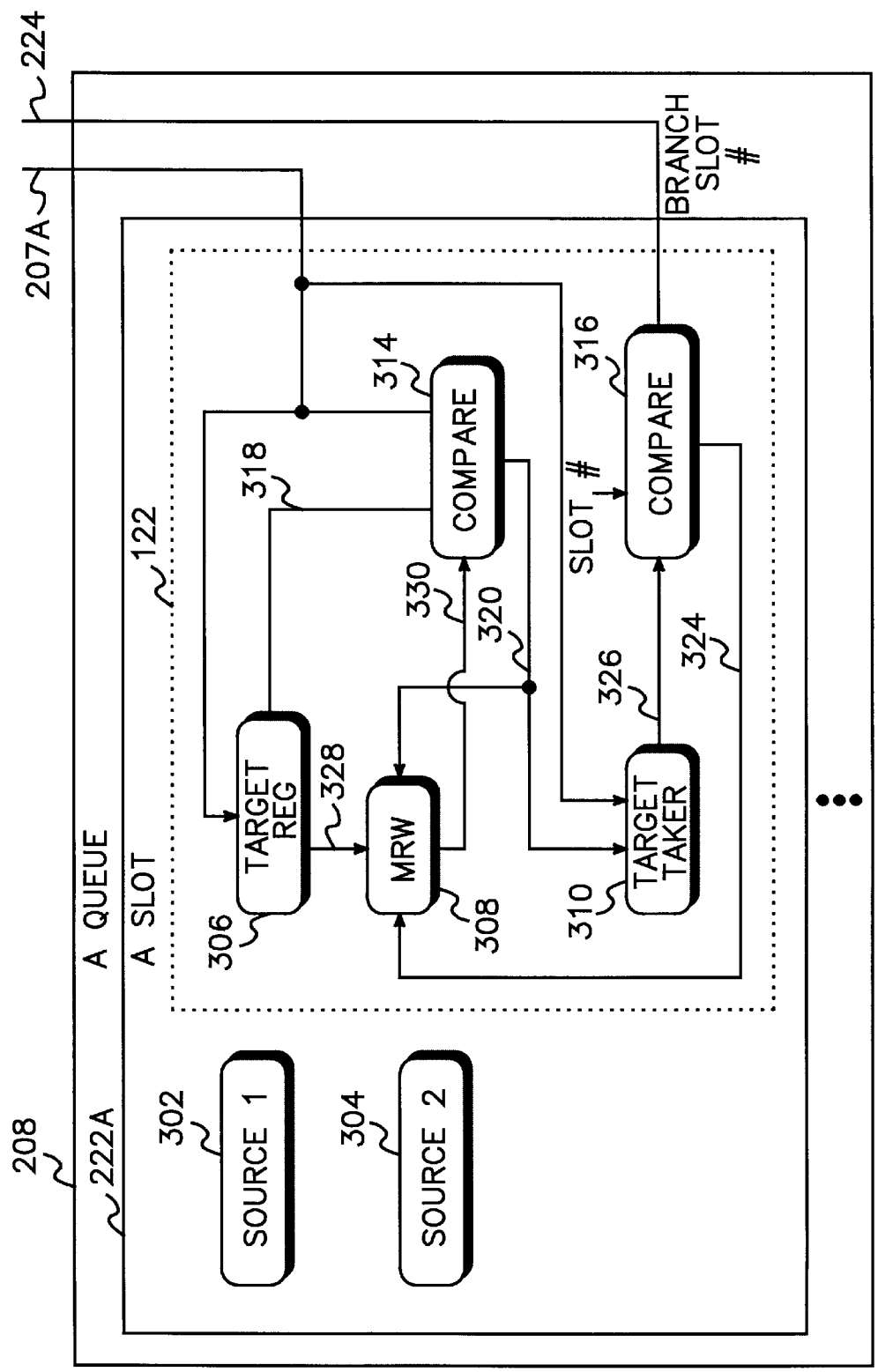
FIG. 3 shows a block diagram of a portion of a slot circuit of the aqueue of FIG. 2, that includes the most recent writer recovery circuit of the present invention.

FIG. 3 shows a block diagram of a portion of a slot circuit 222A of the aqueue 208 of FIG. 2. Referring now to FIG. 3, the aslot 222A, of which there are 28 in the preferred embodiment of the present invention, contains a source 1 register 302 for storing the first operand of the instruction, and a source 2 operand register 304 for storing the second operand of the instruction. A target register 306 stores the register number where the result of the instruction will be stored, after the instruction is retired.

When an instruction is loaded into the a slot 222A, the target register number is received over the bus 207A from the sort system 206 (FIG. 2) and is stored into the target register 306. When this target register information is received and stored into the target register 306, information is sent over a signal 328 to set the most recent writer bit 308. Since this instruction being stored is the most current instruction being processed, it will be the most recent writer for its target register. It may, however, lose this most recent writer status to a later stored instruction.

When a new instruction is stored into the aqueue 208, its target register is also sent over the bus 207A, and the new instruction target register is input to a compare circuit 314. Because the a slot 222A has its most recent writer bit set, the signal 330 will cause the compare circuit 314 to compare the new instruction target register being received over the bus 207A to the value stored in the target register 306. If the two register numbers are equal, a match indication is sent over a signal 320 which resets the most recent writer bit 308, since this new instruction being stored is more recent than the instruction already in the aqueue, and therefore it is the most recent writer of the target register, thus the instruction contained in the slot 222A loses its most recent writer status.

At the same time the most recent writer bit 308 is reset, signal 320 gates the slot number of the new instruction, received from the sort system 206, to be stored into a target taker register 310. Thus, each instruction knows that either it has most recent writer status for the target register, thus its rename register output will contain the most recent data for the target register, or it contains the slot number for the instruction that replaced it as the most recent writer of the target register, since this slot number is now stored into the target taker register 310.

When a mispredicted branch occurs, the ALU 214 (FIG. 2) sends a signal 224 to the aqueue 208 and the mqueue 210. The signal 224 includes the slot number of the mispredicted branch. This slot number is input to a compare circuit 316 which also receives the slot number of the target taker 310 over a bus 326. In addition, the compare circuit 316 receives the slot number of the a slot 222A, which allows it to determine whether the branch occurs before or after the slot performing the compare. If the slot number in the target taker register 310 is greater than the slot number of the mispredicted branch, then the instruction contained within the target taker slot will be discarded, because of the mispredicted branch. If the target taker slot instruction is to be discarded, then the the slot performing the compare must regain the most recent writer status. Thus, if the output of compare circuit 316 indicates that the slot number in the target taker register 310 is greater than the branch slot number being received over bus 224, then signal 324 sets the most recent writer bit 308.

The setting of the most recent writer bit 308 will only occur, however, if the slot number for the mispredicted branch is greater than the slot performing the compare. This is necessary, because if the mispredicted branch is earlier than the instruction in slot doing the compare, then this instruction will also be discarded and there is no reason for it to regain the most recent writer status. Thus, the compare circuit 316 compares the mispredicted branch slot number to its slot number as well as the target taker slot number before determining whether or not to set the most recent writer status bit 308.

As discussed above, the aqueue 208 and the mqueue 210 are circular queues implemented such that after an instruction is stored into the last slot of the queue, the following instruction will be stored into the first slot of the queue. To provide a mechanism for comparing the slot numbers, an extra bit, called the extend bit, is added to the address of each slot in the aqueue and the mqueue. After an instruction is stored in the last slot of one of the queues, the value of the extend bit is inverted for the next set of instructions to be stored in the queue. For example, if the extend bit were zero when an instruction is stored in the last slot of the aqueue, the extend bit will be changed to a one for the next instruction that is stored in slot zero. Similarly, if the extend bit is a one when the last instruction is stored, the extend bit will be changed to a zero for the next instruction that is stored into slot zero.

Figure 4:
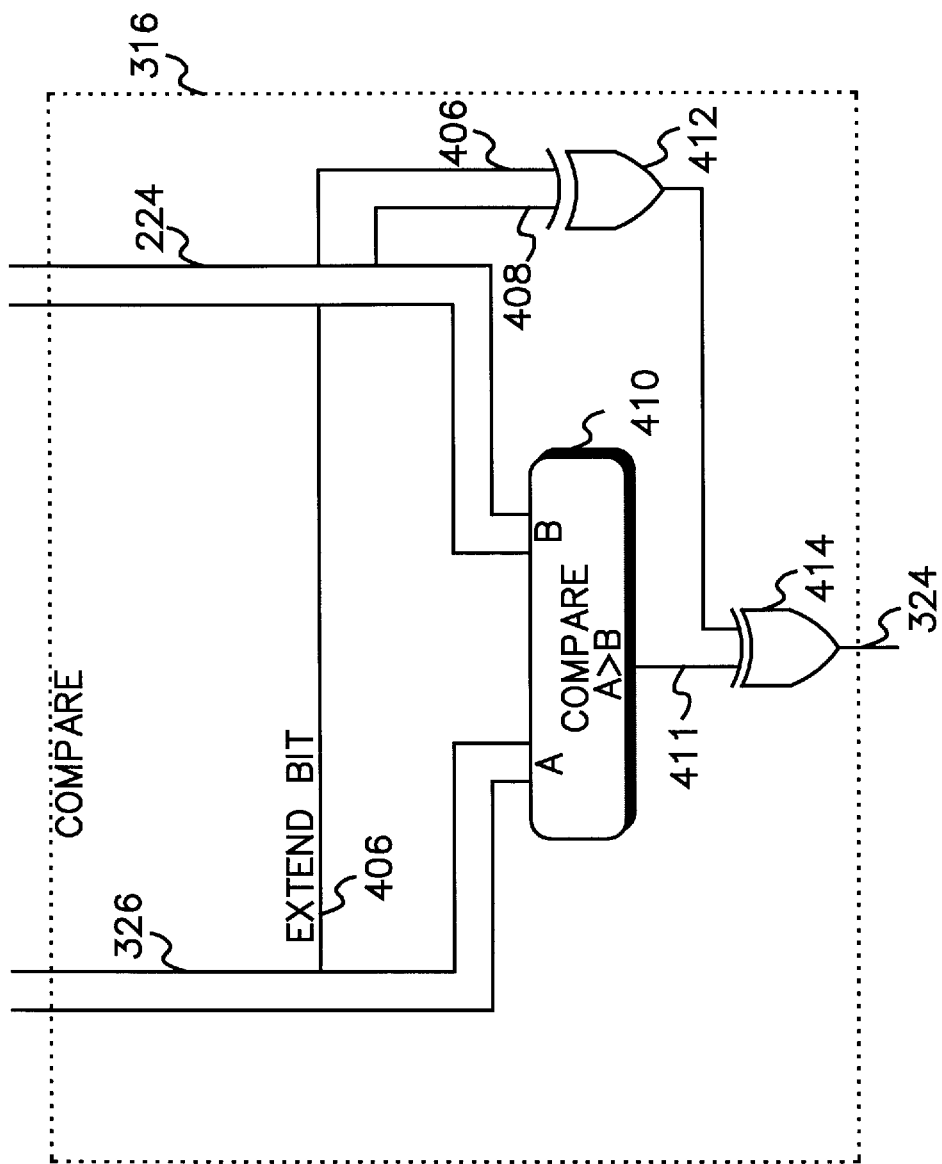
FIG. 4 shows a block diagram of a part of the comparator circuits within the most recent writer recovery circuit.

Because of the extend bit, comparing the slot numbers requires a special compare circuit. This compare circuit is shown in FIG. 4. Referring now to FIG. 4, a conventional compare circuit 410) compares all of the bits that address the slot numbers, except for the extend bits. Thus, the output 411 of the compare circuit 410 indicates whether the target taker input on bus 326 is greater than the mispredicted branch slot number input on bus 224.

The extend bits are connected to an exclusive OR gate 412. The extend bit 406 from the target taker bus 326 is connected to one input of an exclusive OR circuit 412 and the extend bit 408 from the branch slot number bus 224 is connected to the other input of the exclusive OR circuit 412. The output of the exclusive OR circuit 412 is input to a second exclusive OR circuit 414 and the output of the compare circuit 410 is input to the other input of the exclusive OR circuit 414. The result of the circuit of FIG. 4 is that if the extend bits differ between the target taker slot 326 and the branch slot 224, the output of the compare circuit 410 is inverted. When the extend bits are the same, the output of the compare circuit 410 is not inverted. This resolves the ambiguity where a slot having a lower slot number contains an instruction that was stored after a slot with a higher slot number because the storing of instruction has gone beyond the end of the queue and restarted with the beginning of the queue.

FIG. 5 shows an example that illustrates the reacquisition of the most recent writer status. Referring now to FIG. 5, an instruction has been stored into slot 1 that writes its result into target register 3. Subsequently to the instruction being stored in slot 1, a branch instruction was stored in slot 4. Subsequent to the branch instruction being stored in slot 4, another instruction is stored in slot 7, and this instruction also stores its results into register 3. When the instruction was stored in slot 7, the most recent writer recovery circuit 122 (FIG. 3) caused the most recent writer status bit 308 in slot 1 to be reset, and caused slot number 7 to be stored into the target taker register 310 of slot 1.

If the branch contained in slot 4 turns out to be mispredicted, slot 4 will be sent over bus 224 to the circuitry 122. When slot 4 arrives in the compare circuit 316 of slot 1, the compare circuit 316 compares slot 4 from bus 224 to the slot number 7 contained in target taker register 310 of slot 1, and the compare circuit 316 indicates that the slot in target taker register 310 is greater than the branch slot number input on bus 224. Thus, signal 324 will be used to set the most recent writer bit 308 of slot 1, as indicated by the (set) contents of the MRW column of FIG. 5.

The present invention can also be expressed as a method for facilitating recovering most recent writer status when correcting for a mispredicted branch in a processor of a computer system that executes instruction out of order. The steps of the method are 1) storing instructions to be executed in an order the instructions are fetched from a memory of the computer system, and 2) receiving instructions being stored into a queue. Step 2) has substeps that include receiving, into a slot of the queue, a target register number of a register for receiving the results of an instruction received into the slot; storing an indication that the instruction in the slot is the last instruction in the queue to write to the target register number; comparing the target register number to a second target register number received when a second instruction is being inserted into the queue, and storing a slot number of the second instruction, when the compare circuit indicates that the target register number equals the second target register number; and receiving a slot number of a mispredicted branch and comparing the slot number of the mispredicted branch to the second instruction slot number, and setting the most recent writer status bit of the slot when the second compare circuit indicates that the second instruction slot number is greater than the slot number of the mispredicted branch.

Having thus described a presently preferred embodiment of the present invention, it will be understood by those skilled in the art that many changes in construction and circuitry and widely differing embodiments and applications of the invention will suggest themselves without departing from the scope of the present invention as defined in the claims. The disclosures and the description herein are intended to be illustrative and are not in any sense limiting of the invention, defined in scope by the following claims.

What is claimed is:

1. A system for facilitating recovering most recent writer status when correcting for a mispredicted branch in a processor of a computer system that executes instruction out of order, said system comprising:

a sort system within said processor for storing instructions to be executed in an order said instructions are fetched from a memory of said computer system;

a queue comprising a plurality of slots for receiving instructions from said sort system, each said slot comprising a target register for receiving a target register number of a register for receiving the results of an instruction stored in said slot, a most recent writer status bit for storing an indication that an instruction stored in said slot is the last instruction in said queue to write to said target register number, a target taker register for receiving a target taker slot number of a second instruction that replaces said instruction in said slot as a most recent writer, a first compare circuit for comparing said target register number to a second target register number received when a second instruction is being inserted into said queue, and for storing, into said target taker register, a slot number of said second instruction, when said compare circuit indicates that said target register number equals said second target register number, a second compare circuit for receiving a slot number of a mispredicted branch and for comparing said slot number of said mispredicted branch to said target taker slot number, and for setting said most recent writer status bit when said second compare circuit indicates that said target taker slot number is greater than said slot number of said mispredicted branch.

2. The system of claim 1 wherein said second compare circuit further comprises a circuit for comparing a slot number of said slot containing said second compare circuit to said slot number of said mispredicted branch and for preventing said setting of said most recent writer status bit when said slot number of said mispredicted branch is less than said slot number of said slot containing said second compare circuit.

3. The system of claim 1 wherein said queue further comprises:

an extend bit appended to a beginning of each slot number within said queue; and a circuit for inverting a value of said extend bit whenever storing instructions in said slots of said queue progresses from an end of said queue back to a beginning of said queue.

4. The system of claim 3 wherein said second compare circuit further comprises:

a first circuit for comparing an extend bit of said slot number of said mispredicted branch to an extend bit of said target taker slot number and for setting said most recent writer status bit when said second compare circuit indicates that said target taker slot number is greater than said slot number of said mispredicted branch and said extend bit of said slot number of said mispredicted branch matches said extend bit of said target taker slot number, a second circuit for comparing said extend bit of said slot number of said mispredicted branch to said extend bit of said target taker slot number and for setting said most recent writer status bit when said second compare circuit indicates that said target taker slot number is less than said slot number of said mispredicted branch and said extend bit of said slot number of said mispredicted branch does not match said extend bit of said target taker slot number.

5. A method for facilitating recovering most recent writer status when correcting for a mispredicted branch in a processor of a computer system that executes instruction out of order, said method comprising the steps of:

(a) storing instructions to be executed in an order said instructions are fetched from a memory of said computer system;

(b) receiving instructions being stored into a queue, comprising the steps of (b1) receiving, into a target register of a slot of said queue, a target register number of a register for receiving the results of an instruction received into said slot, (b2) storing, in a most recent writer status bit of said slot, an indication that said instruction in said slot is the last instruction in said queue to write to said target register number, (b3) comparing said target register number to a second target register number received when a second instruction is being inserted into said queue, and storing, in a target taker register of said slot, a slot number of said second instruction, when said comparing indicates that said target register number equals said second target register number, wherein said second instruction replaces said instruction in said slot as a most recent writer, (b4) receiving a slot number of a mispredicted branch and comparing said slot number of said mispredicted branch to said second instruction slot number in said target taker register, and setting said most recent writer status bit of said slot when said comparing said slot number of said mispredicted branch to said second instruction slot number indicates that said second instruction slot number is greater than said slot number of said mispredicted branch.

6. The method of claim 5 wherein step (b4) further comprises the step of comparing a slot number of said slot to said slot number of said mispredicted branch and preventing said setting of said most recent writer status bit when said slot number of said mispredicted branch is less than said slot number of said slot.

7. The method of claim 5 wherein step (b) further comprises the steps of:

appending an extend bit to a beginning of each slot number within said queue; and inverting a value of said extend bit whenever storing instructions in said slots of said queue progresses from an end of said queue back to a beginning of said queue.

8. The method of claim 7 wherein step (b4) further comprises the steps of:

(b4a) comparing an extend bit of said slot number of said mispredicted branch to an extend bit of said second instruction slot number and setting said most recent writer status bit when said comparing indicates that said second instruction slot number is greater than said slot number of said mispredicted branch and said extend bit of said slot number of said mispredicted branch matches said extend bit of said target taker slot number; and (b4b) comparing said extend bit of said slot number of said mispredicted branch to said extend bit of said second instruction slot number and setting said most recent writer status bit when said comparing indicates that said second instruction slot number is less than said slot number of said mispredicted branch and said extend bit of said slot number of said mispredicted branch does not match said extend bit of said target taker slot number.

9. A system for facilitating recovering most recent writer status when correcting for a mispredicted branch in a processor of a computer system that executes instruction out of order, said system comprising:

means for storing instructions to be executed in an order said instructions are fetched from a memory of said computer system;

a queue for receiving instructions being stored, said queue comprising means for receiving, into a target register of a slot of said queue, a target register number of a register receiving the results of an instruction received into said slot, means for storing, in a most recent writer status bit of said slot, an indication that said instruction in said slot is the last instruction in said queue to write to said target register number, means for comparing said target register number to a second target register number received when a second instruction is being inserted into said queue, and for storing, in a target taker register of said slot, a slot number of said second instruction, when said means for comparing indicates that said target register number equals said second target register number, wherein said second instruction replaces said instruction in said slot as a most recent writer, means for receiving a slot number of a mispredicted branch and for comparing said slot number of said mispredicted branch to said second instruction slot number in said target taker register, and setting said most recent writer status bit of said slot when said means for comparing said slot number of said mispredicted branch to said second instruction slot number indicates that said second instruction slot number is greater than said slot number of said mispredicted branch.

10. The system of claim 9 wherein means for receiving and comparing further comprises means for comparing a slot number of said slot to said slot number of said mispredicted branch and means for preventing said setting of said most recent writer status bit when said slot number of said mispredicted branch is less than said slot number of said slot.

11. The system of claim 9 wherein said queue further comprises:

means for appending an extend bit to a beginning of each slot number within said queue; and means for inverting a value of said extend bit whenever storing instructions in said slots of said queue progresses from an end of said queue back to a beginning of said queue.

12. The system of claim 11 wherein said means for receiving and comparing further comprises:

means for comparing an extend bit of said slot number of said mispredicted branch to an extend bit of said second instruction slot number and for setting said most recent writer status bit when said means for comparing indicates that said second instruction slot number is greater than said slot number of said mispredicted branch and said extend bit of said slot number of said mispredicted branch matches said extend bit of said target taker slot number; and means for comparing said extend bit of said slot number of said mispredicted branch to said extend bit of said second instruction slot number and for setting said most recent writer status bit when said means for comparing indicates that said second instruction slot number is less than said slot number of said mispredicted branch and said extend bit of said slot number of said mispredicted branch does not match said extend bit of said target taker slot number.

* * * * *